June 10, 1952 N. PLANK 2,600,073
PRESSURE REGULATOR
Filed Jan. 24, 1949 3 Sheets-Sheet 1

Inventor: Norris Plank
By
His Attorney

Patented June 10, 1952

2,600,073

UNITED STATES PATENT OFFICE 2,600,073

PRESSURE REGULATOR

Norris Plank, East Chicago, Ind., assignor to Shell Development Company, San Francisco, Calif., a corporation of Delaware Application January 24, 1949, Serial No. 72,308

3 Claims. (Cl. 137—153)

This invention relates to pressure regulators and to pressure responsive flow regulators and pertains more particularly to self-energized pressure or flow regulators for use in controlling and maintaining predetermined or constant and preferably substantially high pressures and/or rates of flow in fluid flow lines. In order to secure close and sensitive pressure control in pipe lines, numerous types of pilot operated pressure control regulators have been designed.

However, the location and operating conditions of many fluid flow lines, e. g. petroleum pipe lines, often render the use of most types of pressure regulators impractical and inadequate. In general, these regulators are operated by pilot valves that are actuated by an auxiliary pressure fluid, such as for example air, oil, or any other suitable fluid. Since the installation of an individual pneumatic or hydraulic system at each valve or regulator in a cross-country pipe line entails considerable expense and maintenance, it is desirable to install self-energized regulators, especially at the more isolated locations. These regulators must be of rugged construction and possess smooth and stable operation so as to withstand and control high pressures and rates-of-flow, e. g., 1000 p. s. i. and 1000 g. p. m., respectively. Most of the present self-energized pressure and flow regulators of the diaphragm type are only designed to control relatively low pressures and rates-of-flow and would be damaged or made inoperative by high pressures and especially by high pressure surges across the main diaphragm unit.

It is therefore an object of this invention to provide a pressure and flow regulator that is self-energized in that its operation is responsive to and controlled by the pressure or flow in the fluid conduit and is independent of any auxiliary pneumatic or hydraulic control means.

It is also an object of the present invention to provide a self-energized pressure and flow regulator of a simple and sturdy design for use in pipe line systems handling high pressures or rates-of-flow.

It is a further object of this invention to provide a self-energized pressure or flow regulator with stream-lined flow course through a single-seat ring and adapted to dampen and stop "chatter" or "hammer" of the main valve on its seat.

Another object of the present invention is to provide a self-energized pressure regulator of the diaphragm type which is responsive to small differential between the pressures above and below the diaphragms of the regulator, the diaphragms of said regulator being adequately protected against rupture or permanent distortion by high pressure differential in the order of 1000 p. s. i. across the diaphragm unit.

A still further object of the present invention is to provide a self-energized pressure regulator of the above-mentioned characteristics wherein the pilot valve actuating said regulator is responsive to relatively very small changes in pressure.

Other objects and advantages of the invention will become apparent from the following detailed description taken with reference to the drawing wherein.

Figure 1:
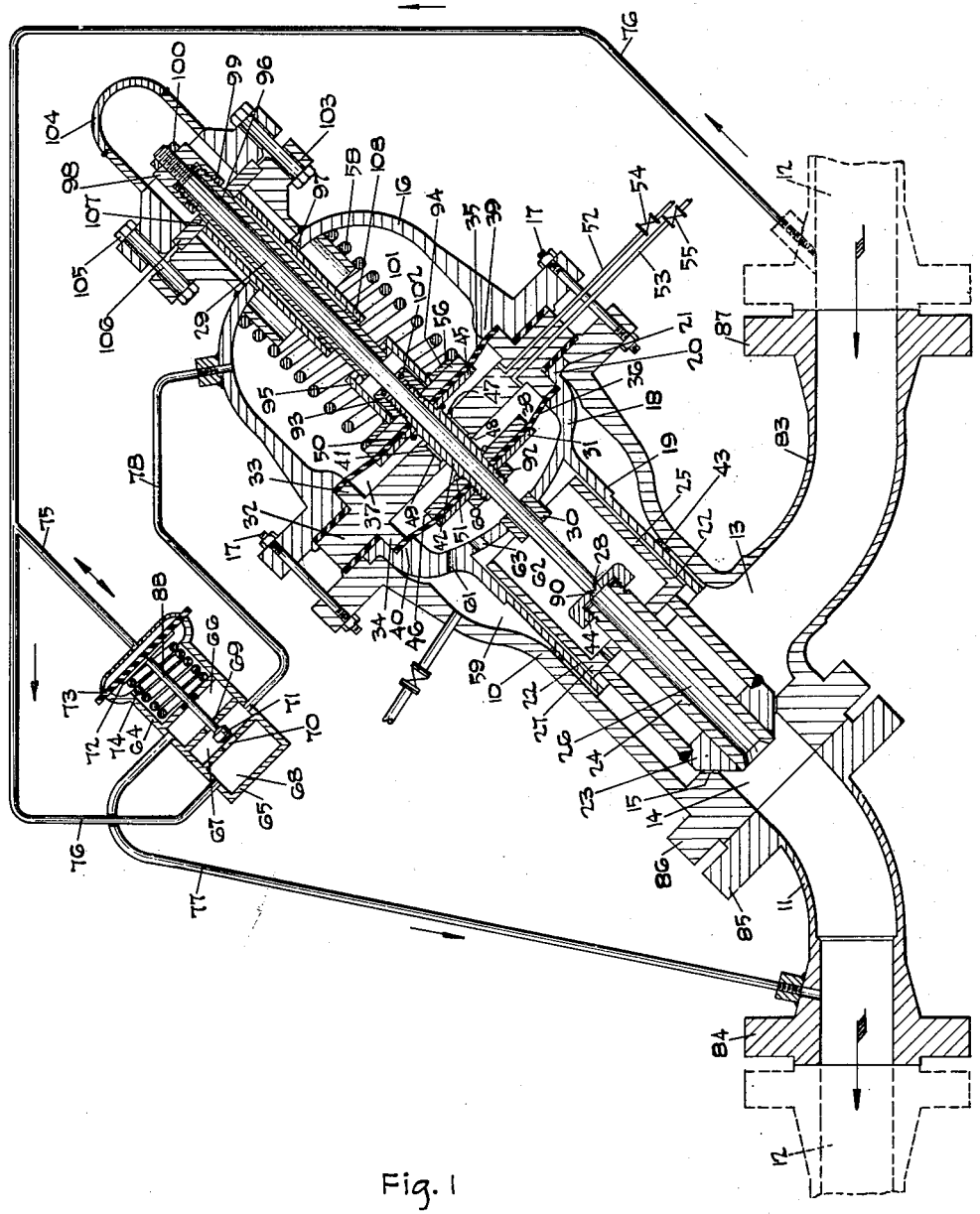
Figure 1 is a diagrammatic view, partly in cross section, of a preferred embodiment of a pressure regulator of the present invention connected to a pilot valve for back pressure service.

Referring to Figure 1 of the drawing, a pressure regulator of the present invention is shown having a flanged housing 10 adapted to be installed in a fluid flow line diagrammatically indicated by dotted lines at 12, such as for example, a petroleum products pipe line. This installation may be effected by any desired means comprising, for example, elbows 11 and 83 and flanges 84, 85, 86 and 87. The housing 10 has a fluid inlet port 13 and a fluid outlet port 14 with a preferably beveled valve seat 15 formed around said fluid outlet port inside said housing. The open top of the housing 10 is flanged, whereby a flanged bonnet 16 may be secured thereto by bolts 17. Positioned in any suitable manner within the housing 10 is a diaphragm casing 18 having a guide cylinder 19, preferably attached to or formed on the bottom of said casing. The guide cylinder 19 is sealed in a fluid-tight manner within the housing 10 in any suitable manner as by a seal ring 43. In the embodiment of Figure 1, the top of the diaphragm casing 18 has a circular flange 20 that rests on a shoulder 21 in the housing 10.

The main valve assembly comprises any suitable closure means such as a valve or plug 23 mounted at the lower end of a valve stem 24, which is in turn fixedly secured to a guide piston member 25 mounted for sliding movement within the guide cylinder 19. The guide piston 25 is substantially larger in diameter than valve port 14. Extending through the valve stem 24 and plug 23 is a small fluid conduit or channel means 26 in communication between the downstream side of the valve plug 23 and the inside of the guide piston member 25. The guide piston member 25 is in the form of a hollow cylinder having a closed end 27, the opposite sides of which serve as the two faces of the piston.

The hollow piston member 25 contains a needle valve assembly therein for controlling fluid flow through the fluid conduit 26. This assembly comprises a valve stem 24, which may extend into the piston member 25. A valve seat nut 44 having an orifice 90 therethrough is threadedly secured to the extended end of said stem 24, said orifice being adapted to be closed by a small plug, or needle-type valve 28 secured to or formed at one end of a valve stem 29. The valve stem 29 is mounted for sliding movement in a bushing 30 positioned centrally of the diaphragm casing 18.

The diaphragm assembly comprises a central support plate 32 having raised flanges 33 and 34 upon which a pair of flexible diaphragms 35 and 36 may be positioned or secured in spaced relationship to said plate 32 so as to form fluid-tight chambers 37 and 38 on opposite sides thereof. The diaphragms 35 and 36 may be made of any flexible material, such as for example, rubber, rubberized canvas, sheet metal, or the like, which may be secured in any suitable manner, as by cementing, soldering, etc., to the flanges 33 and 34. In the embodiment of Figure 1, shoulders 39 and 40 are formed or machined in the bonnet 16 and diaphragm casing 18, respectively, so that when the bonnet 16 is bolted in place the upper diaphragm 35 is clamped between flange 33 and shoulder 39 while the lower diaphragm 36 is clamped between flange 34 and the adjacent shoulder 40.

Centrally located in a hole 41 in the center of the support plate 32 is a slidably mounted tubular dual valve stem 42. An annular space 49 between the outer wall of said tubular valve stem 42, and inner wall of valve port permits fluid to circulate from one side of the support plate 32 to the other. Secured to the ends of the valve stem 42 on opposite sides of said plate 32 and spaced therefrom are suitable valve-closure means, such as, for example, valve plates 45 and 46, formed so as to fit tightly against the beveled valve seats 47 and 48 around the edges of the hole in the plate 32 when forced thereagainst. A more positive seal between the valves and their seats may be secured by the use of rubber ring seals 50 and 51 suitably secured to the valve plates. The distance between the attached valve plates 45 and 46 is preferably the same as the distance between the diaphragms 35 and 36 so that the valve plates normally contact their adjacent diaphragms when no pressures are applied to said diaphragms. Both chambers 37 and 38 of the diaphragm assembly are filled with any suitable clean fluid such as oil, said fluid being relatively incompressible, of a constant viscosity and having a low freezing point. The diaphragm assembly may be filled through one of the conduits 52 or 53 which are normally closed by valves 54 and 55.

A pair of diaphragm contact discs 31 and 56 are mounted at the ends of the valve stem 42, on the outside of said diaphragms 35 and 36, said discs being fixedly secured by lock nuts 92 and 93. Lock nut 93 may be equipped with a seal ring 102 or other suitable packing means to prevent fluid in the valve from flowing along the outside of the valve stem 29 from one side of the diaphragm assembly to the other. In face-to-face contact with the upper diaphragm contact disc 56 and movable therewith, is a spring plate assembly comprising a spring plate 94 having fixedly attached to one side thereof coaxial tubular guide members 95 and 96, said member 96 being of a length to extend through a control opening 97 in the top of the bonnet 16 and being threaded at the end thereof. The rod-like valve stem 29 extends through the bushing 30, tubular valve stem 42, contact discs 31 and 56, nuts 92 and 93, spring plate 94 and tubular members 95 and 96 to a point outside the valve bonnet 16 where the end of said valve stem 29 is threaded. An adjustable coupling nut 98 fixedly secures the threaded upper end of the valve stem 29 to the threaded end of tubular member 96 of the spring plate assembly. Lock nuts 99 and 100 may be used to maintain the coupling nut 98 in a fixed position. Thus, the coupling nut 98 provides convenient means for setting and re-setting the valve stem 29 and attached valve plug 28 in proper relation to other moving parts within the regulator without the necessity of dismantling the regulator during each setting.

Surrounding the tubular guide member 96 and mounted between the inner surface of the bonnet 16 and the top surface of the spring plate 94 is a diaphragm compression spring 58 which maintains a predetermined pressure on the upper diaphragm 35 through the contact disc 56. The adjustability of the valve stem 29 with regard to the spring assembly, through coupling nut 98 and tubular guide member 96, permits the spring assembly to be set so that the spring force is stopped or removed from the diaphragm 35 before the valve 45 reaches its seat, thus allowing only a small pressure from below to unseat it again. One purpose of the spring 58 is to set up a minimum pressure differential across the regulator (about 5 p. s. i.) which makes it normally possible at all times for the fluid to bleed from the bonnet chamber 101 into the pipe line 12 downstream of the main valve 23. If desired an adjustable diaphragm spring may be used. Thus, by adjusting the diaphragm spring 58 or by installing another spring having more or less compression, the differential pressure across the valve to be maintained during operation may be set at any desired value.

Affixed to the bonnet 16, as by welding, and surrounding the central opening 97 in the top thereof is a flange 103 to which a cap 104 is secured by bolts 105 in a fluid-tight manner. Preferably a guide plate 106 with a central hole 107 therethrough is clamped between said flange 103 and flanged cap 104 to serve as a guide for the movable valve stem 29 and the attached tubular member 96. A spring guide tube 108 may be affixed to said guide plate 106 so as to extend into the bonnet 16.

The space 59 within the housing 10 is in communication with the space 60 within the diaphragm casing 18 through one or more ports 61, while the space 60 is in communication with the space 62 inside the hollow piston 25 through a port 63. The rate of fluid flow into the hollow piston 25 is controlled by the size of the restricted passageway 22.

Figure 3:
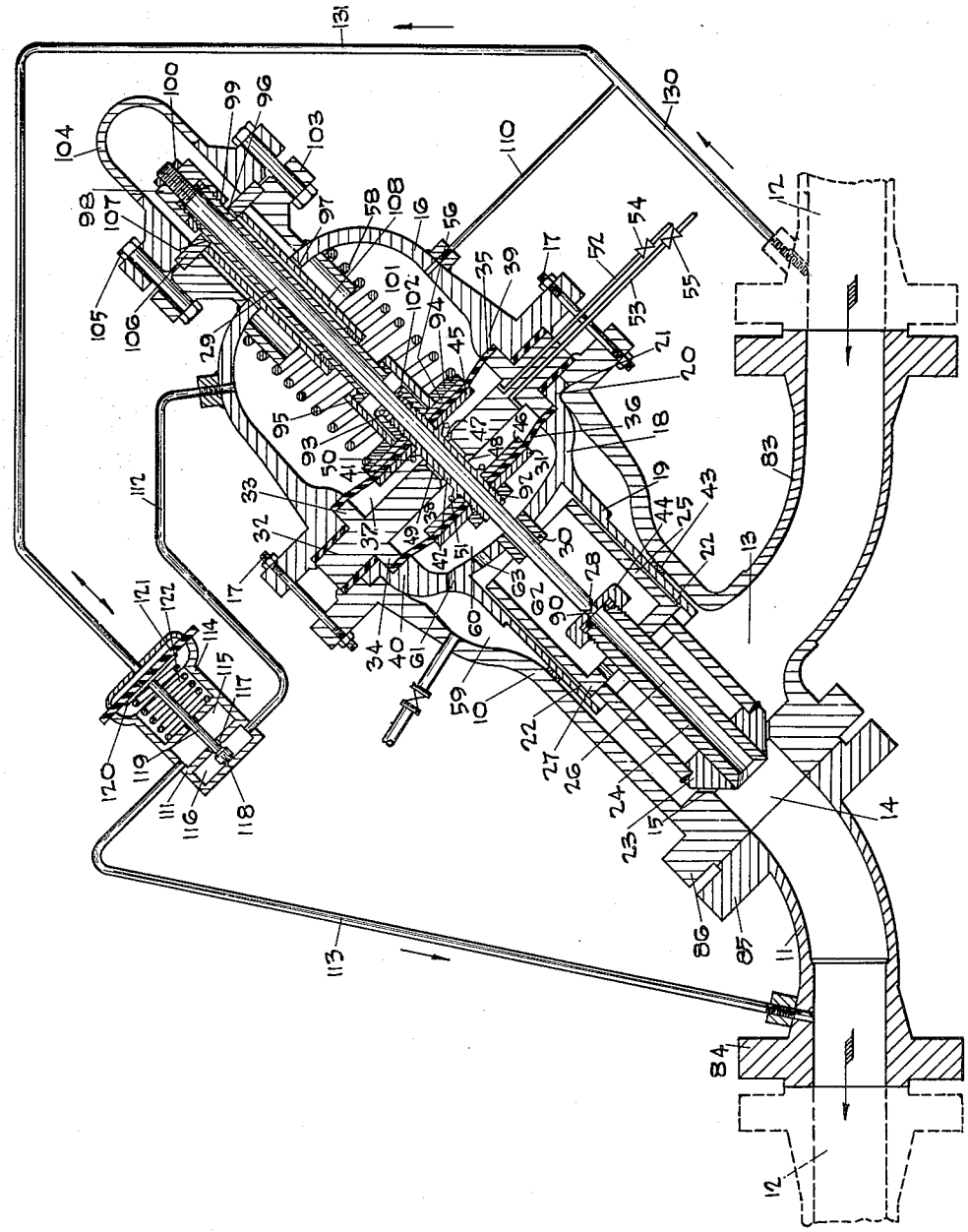
Figure 3 is another view of the present regulator diagrammatically showing it connected to a single-seated pilot valve.

In order to operate the present regulator, it is necessary that the pressure fluid operating said regulator be admitted to and allowed to bleed from the bonnet chamber 101 of said regulator at a controlled rate. The pressure fluid for operating said regulator may be supplied through a pilot valve 64 (Fig. 1) or a restricted passageway 110 (Fig. 3) while a pilot valve 64 or 111 (Figs. 1 and 3, respectively) may be used to bleed pressure fluid from the bonnet 16. A preferred arrangement is shown in Figure 3 wherein the pressure fluid operating said regulator is supplied through a restricted passage such as an orifice, needle valve, or a length of tubing 110 of reduced diameter. In conjunction with this restricted passage 110, a single-seated variable-flow pilot valve 111 is inserted in the bleed line 112–113 between the bonnet 16 and the downstream side of the regulator.

The pilot valve 111 comprises a casing 114 having two compartments 115 and 116 which are in communication through a valved port 117 which may be closed by a valve 118. The valve 118 is attached to a valve stem 119 which has a diaphragm disc 120 at its other end in contact with a flexible diaphragm 121 that is secured across the valve casing 114. A compression spring 122 positions the diaphragm disc 120 against the diaphragm at all times. If desired, this spring 122 may be of the adjustable type and thus be pre-set to control the desired operation of the pilot valve 111, and consequently the operation of the pressure regulator to which it is connected.

Figure 2:
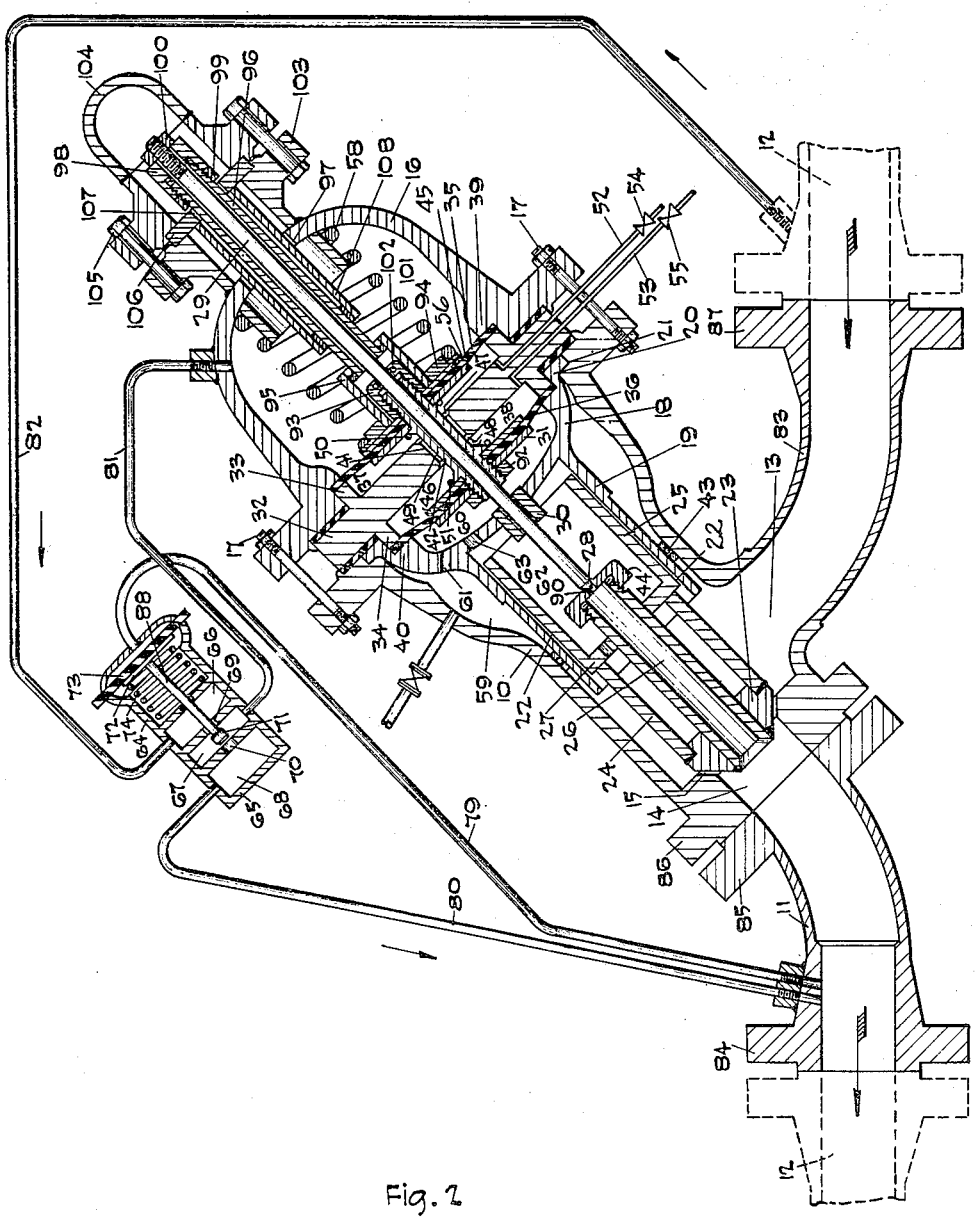
Figure 2 is another view of the pressure regulator diagrammatically showing it connected to a pilot valve for pressure reducing service.

Other embodiments of the present regulator are shown in Figures 1 and 2 utilizing a double-seated pilot valve 64 which comprises a casing 65 having three compartments 66, 67 and 68 which may communicate with each other through ports 69 and 70. Positioned in the center compartment 67 is a valve 71 for closing either port 69 or 70, both of said ports being normally open when the valve 71 is positioned between them. The valve 71 is attached to a valve stem which has a diaphragm disc 72 at its other end in contact with a flexible diaphragm 73 that is secured across the valve casing 65. A compression spring 74 positions the diaphragm disc 72 against said diaphragm at all times. If desired, this spring 74 may be of the adjustable type and thus be pre-set to control the desired operation of the pilot valve 64, and consequently the pressure regulator which it actuates.

The pivot valve 64 is shown diagrammatically as being connected to the flow regulator and to the fluid flow lines for two different operating conditions. In Figure 1 the conduits 75, 76, 77 and 78 diagrammatically represent the connections necessary when the pressure regulator is being used for back pressure service, while the conduits 79, 80, 81 and 82 in Figure 2 diagrammatically represent the connections necessary when the pressure regulator is used in pressure reducing service.

To illustrate the use of the pressure regulator of the present invention, its operation when used in both back pressure service and pressure reducing service is described hereinbelow. In all instances all portions of the pressure regulator, with the exception of the diaphragm assembly, are filled with the fluid entering the regulator from the fluid pipe line 12. As hereinabove mentioned, the diaphragm assembly is filled with a separate fluid and is sealed so that none of this fluid can escape, thus forming an independent fluid system that is affected only when pressure is applied to either diaphragm 35 or 36. For example, when pressure is applied to the outer surface of the lower diaphragm 36, the pressure will bend the flexible diaphragm toward the central support plate 32 and the fluid in the compartment 38 between said diaphragm and said plate will be forced through the annular space 49 between the tubular valve stem 42 and plate 32 into the other compartment 37 on the opposite side of the plate 32, thus causing a corresponding movement of the upper diaphragm 35. Since the valve stem 42 is slidably mounted in the plate 32, it will also be moved with the diaphragms 35 and 36 until the valve 46 contacts the valve seat 48 thereby closing said valve 46 and preventing any more fluid from being forced through the annular space 49. Thus, when the valve 46 is closed, continued or increased pressure on the lower diaphragm 36 does not change the pressure against the upper diaphragm 35 which prevents it from being injured or damaged; the fluid trapped between the lower diaphragm 36 and the plate 32 prevents rupture of said lower diaphragm.

Since the annular space 49 between the tubular valve stem 42 and the plate 32 is relatively small in size, the flow of fluid from one side of the diaphragm assembly to the other is restricted. Thus, any sudden pressure imparted to the lower diaphragm 36, such as that caused by the surging of a fluid through the regulator, is damped by the action of the diaphragm assembly so that the regulator is not injured. While the diaphragm assembly is shown as having a valved orifice through the central support plate 32, it is clear that a similar damping action can be obtained by establishing communication between compartments 37 and 38 on either side of said plate merely through a small orifice such as an orifice in the plate 32 without any valve in it. It is also clear that expansible bellows may be used as equivalents of the flexible plate or rubber diaphragms 35 and 36.

When a pressure regulator of the present invention has been installed in a fluid pipe line for back-pressure regulating service, that is, for regulating pressures in the pipe line upstream of the regulator, the flowing fluid enters the fluid inlet 13 and fills all portions of the regulator housing 10. Fluid travels through the passageway 22 between the inner wall of the guide cylinder 19 and the outer wall of the piston 25 and thence through port 63 into the diaphragm casing 18, thus subjecting the lower diaphragm 36 to the upstream pressure. Fluid enters the hollow piston 25 of the main valve assembly through passageway 22 so that when the needle valve 28 is closed upstream pressure is applied to both sides of the transverse plate element 27 of the piston 25 thus maintaining the main valve 23 in a fixed position.

There is also a flow of fluid through the upstream control conduit 76 into the lower chamber 68 of the pilot valve, through the open port 70 into the center chamber 67, out of said chamber through conduit 78 and into the bonnet 16 of the regulator to supply upstream pressure to the upper diaphragm 35. With the upstream pressure on both the upper diaphragm 35 and the lower diaphragm 36, the pressure exerted by the diaphragm spring 58 keeps the diaphragm assembly depressed so that the needle valve 28 and the main valve 23 are both in a closed position.

Upstream pressure is applied to the pilot valve diaphragm 73 through conduit 75, the spring 74 of said pilot valve being pre-set to oppose a certain upstream pressure. When the upstream pressure against the pilot valve diaphragm 73 increases sufficiently to overcome the spring force, it depresses the diaphragm 73 and causes the pilot valve 71 to open port 69 between chambers 66 and 67 in the pilot valve, so that the pressure fluid in the bonnet 16 can flow through conduit 78, chambers 67 and 66 and conduit 77 to the main flow line downstream from the main valve 26.

As pressure fluid bleeds from the bonnet 16 sufficient to lower the pressure therein, say 5 p. s. i. below the pressure in chamber 60 under the lower diaphragm 36, the force of the spring 58 is overcome and the diaphragms 35 and 36 are moved by the upstream pressure which is now applied only to the lower diaphragm 36. The force exerted on diaphragm 36 causes the needle valve 28 and its stem 29 to follow the diaphragm movement which in turn causes valve 28 to move off its seat allowing fluid inside the hollow piston 25 to flow through the orifice 90 and conduit 26 in the stem 24 of the main valve 23 to the downstream side thereof. Since the regulator preferably has a needle valve orifice 90 larger than the passageway 22 leading into the chamber 62, the flow rate through the needle valve exceeds the flow rate of upstream pressure fluid entering the piston chamber 62 inside the hollow piston 25 thus causing the pressure inside said piston to be reduced below the pressure acting on the outside of said piston 25. With such a pressure differential existing, and since the piston has greater area than the valve port 14, the greater upstream pressure acting against the outside face of said piston 25 will cause the piston to slide upward in its guide cylinder 19 thus opening the main valve 23, or, if said main valve had been adjusted to permit a certain rate of flow, moving it to a more open position. The piston 25 moves upward until it approaches the seating position of the needle valve 28. In operation, the piston 25 and the main valve 23 follow the motion of the needle valve very closely.

When the upstream pressure decreases and returns to normal the pre-set pilot valve spring 74 returns the pilot valve 71 to its normal position, opening fluid port 70 and allowing an upstream pressure fluid flow to the bonnet 16 which depresses the diaphragms 35 and 36 to move the main valve 23 again toward a closed position.

In reduced pressure service, that is, for regulating pressures downstream of the regulator, the pilot valve is connected to the pressure regulator as shown in Figure 2. In this case a downstream pressure line 79 is connected to the pilot valve casing 65 to supply the actuating pressure to the diaphragm 73. With the connections as shown in Figure 2 and assuming, for example, that the pressure on the downstream side of the main valve 23 becomes reduced below a predetermined value, the pressure above pilot valve diaphragm 73 also becomes reduced, thus allowing the diaphragm spring to raise the valve 71, opening port 70, whereby the fluid in the bonnet 16 bleeds through conduit 81, chamber 67, port 70, chamber 68 and conduit 80 to the downstream side of the main valve. The removal of fluid pressure from the bonnet 16 allows the diaphragms 35 and 36 to be flexed upwardly by the upstream pressure, thus opening the needle valve 28 and the main valve 23 in the previously-described manner, and thereby raising the pressure in the downstream portion of the pipe line. When the pressure forces on either side of the main diaphragm assembly reach the proper balance, the main diaphragm spring 58 causes the main valve 23 to close or throttle to maintain the downstream pressure at the desired predetermined value.

When the preferred embodiment of the present pressure regulator, illustrated in Figure 3, is installed in a fluid pipe line for back-pressure regulating service, the flowing fluid fills all portions of the regulator housing 10, as previously described. There is also a flow of fluid through an upstream control conduit 130 and through the restricted passage 110 into the bonnet chamber 101 of the regulator to supply upstream pressure to the upper diaphragm 35.

Upstream pressure is also applied to the pilot valve diaphragm 121 through conduits 130 and 131, the spring 122 of said pilot valve being preset to oppose a certain upstream pressure. When the upstream pressure against the pilot valve diaphragm 73 increases sufficiently to overcome the force of the spring 122, it depresses the diaphragm 121 and causes the pilot valve 118 to open port 117 between chambers 115 and 116 in the pilot valve so that the pressure fluid in the bonnet 16 is allowed to flow through conduit 112, chambers 116 and 115 and conduit 113 to the main flow line 12 downstream from the regulator.

As the pressure fluid bleeds from the bonnet 16, the diaphragms 35 and 36 and the attached valve stem 29 are moved upward by the upstream pressure which is applied against the lower diaphragm 36 and the main valve is opened in a manner previously described with regard to the embodiment of Figure 1. When the upstream pressure decreases and returns to normal, the pre-set pilot valve spring 122 moves the pilot valve 118 to a more closed position to decrease the flow of pressure fluid bleeding from the bonnet 16. The flow of upstream pressure fluid to the bonnet 16 through the restricted passageway 110 causes the diaphragm 35 and attached valve stem 29 to move the main valve again toward a more closed position. Thus, in this embodiment the single-seated pilot valve 111 in the bleed line 112—113 operates to vary the bleed stream from the bonnet 16 in relation to the fixed feed stream rate through the restricted passageway 110 to produce the pressure required for operation of the regulator.

While the present pressure regulator has been described as utilizing single or double-seated pilot valves actuated by fluid pressure from the main pipe lines, it is realized that any other suitable type of pilot valve may be employed, such as, for example, pilot valves operated by independent hydraulic, electrical or mechanical means.

It is to be noted that in the preferred embodiment of the present regulator the needle-valve stem 29, coupling nut 98, guide members 96 and 95, spring plate 94 and spring 58 are fastened together as a unit and are free to move upward without carrying with it the diaphragm assembly comprising diaphragms 35 and 36, plates 31, 45, 46 and 56, and valve stem 42. Thus, in the event a sudden back-flow of liquid in line 12 forces the main valve 23 open, the valve stem 29, spring 58 and spring guide assembly are forced upwardly so that spring plate 94 is out of contact with contact plate 56 of the diaphragm assembly, which in turn slowly rises as the diaphragm 35 returns to its normal position. Any possible buckling of the valve stem 29 and/or rupturing of diaphragm 36 by a sudden back-flow of fluid is thus prevented.

The force of the spring 58 is utilized for two purposes. First, it provdies positive mechanical force to return the main valve 23 to its seat 15 from any open position, and second, it provides mechanical force on top of the diaphragm unit to counterbalance a predetermined fluid pressure force on the bottom of the diaphragm unit. However, the downward travel of the spring 58 and the spring guide assembly is preferably limited so that the compression force of said spring 58 is removed from the upper diaphragm 35 before the adjacent valve plate 45 contacts its seat 47 else an abnormally high pressure on the lower diaphragm 36 is needed to subsequently unseat the valve again.

I claim as my invention:

1. In a pipe line pressure regulator a main valve housing, diaphragm means dividing said housing into two chambers, conduit means in communication between the first chamber and the pipe line upstream and downstream of the valve housing for supplying to and draining from said first chamber pressure fluid from the pipe line, pressure responsive valve means in said conduit means, inlet and outlet means connecting the second chamber to the upstream and downstream portions of the pipe line respectively, a valve member in said second chamber adapted to close the outlet means, piston means in said second chamber coaxially spaced from said diaphragm means, said piston means being rigidly connected to said valve member for reciprocating said valve member with regard to the outlet means, one side of said piston means being directly exposed to the upstream pressure of the pipe line, passage means within said second chamber for admitting the upstream pressure at all times to the space between said diaphragm means and the other side of said piston means, channel means through said valve member in communication between said space and the downstream portion of the pipe line, and auxiliary valve means controlling the flow through said channel means in said valve member and movable therewith, said auxiliary valve means being actuated by said diaphragm means to control the fluid flow through said channel means, said diaphragm means comprising two spaced diaphragms, rigid plate means parallel to said diaphragm dividing the space therebetween into two fluidtight chambers adapted to contain a pressure fluid, orifice means through said plate means in communication between said fluidtight chambers, and valve means for closing said orifice means when the diaphragms are subjected to high pressure surges.

2. In a pipe line pressure regulator a main valve housing, diaphragm means dividing said housing into two chambers, conduit means in communication between the first chamber and the pipe line upstream and downstream of the valve housing for supplying to and draining from said first chamber pressure fluid from the pipe line, pressure responsive valve means in said conduit means, inlet and outlet means connecting the second chamber to the upstream and downstream portions of the pipe line respectively, a valve member in said second chamber adapted to close the outlet means, piston means in said second chamber coaxially spaced from said diaphragm means, said piston means being rigidly connected to said valve member for reciprocating said valve member with regard to the outlet means, one side of said piston means being directly exposed to the upstream pressure of the pipe line, passage means within said second chamber for admitting the upstream pressure at all times to the space between said diaphragm means and the other side of said piston means, channel means through said valve member in communication between said space and the downstream portion of the pipe line, and auxiliary valve means controlling the flow through said channel means in said valve member and movable therewith, said auxiliary valve means being actuated by said diaphragm means to control the fluid flow through said channel means, said diaphragm means comprising a cylindrical diaphragm casing having open ends, flexible diaphragms closing said open ends, transverse plate means dividing said casing into two fluidtight chambers, said chambers being filled with a liquid, orifice means through said plate means in communication between said chambers, rigid spacing means between said diaphragms slidably mounted in said orifice means, whereby said diaphragms are caused to move in unison in response to a differential pressure applied thereto, valve means carried on said rigid spacing means for closing said orifice means when the diaphragms are subjected to high surge pressures, and normally closed conduit means in said casing for introducing a liquid thereinto.

3. In a pipe line pressure regulator a main valve housing, diaphragm means dividing said housing into two chambers, conduit means in communication between the first chamber and the pipe line upstream and downstream of the valve housing for supplying to and draining from said first chamber pressure fluid from the pipe line, pressure responsive valve means in said conduit means, inlet and outlet means connecting the second chamber to the upstream and downstream portions of the pipe line respectively, a valve member in said second chamber adapted to close the outlet means, piston means in said second chamber coaxially spaced from said diaphragm means, said piston means being rigidly connected to said valve member for reciprocating said valve member with regard to the outlet means, one side of said piston means being directly exposed to the upstream pressure of the pipe line, passage means within said second chamber for admitting the upstream pressure at all times to the space between said diaphragm means and the other side of said piston means, channel means through said valve member in communication between said space and the downstream portion of the pipe line, and auxiliary valve means controlling the flow through said channel means in said valve member and movable therewith, said auxiliary valve means being actuated by said diaphragm means to control the fluid flow through said channel means, said diaphragm means comprising a diaphragm casing having open ends, flexible diaphragms closing said open ends, transverse plate means dividing said casing into two fluidtight chambers, said chambers being filled with a liquid, orifice means through said plate means in communication between said chambers, rigid spacing means between said diaphragms slidably mounted in said orifice means causing said diaphragms to move in unison in response to a differential pressure applied thereto, valve means carried on said rigid spacing means for closing said orifice means when the diaphragms are subjected to excessive pressures, and normally closed conduit means in said casing for introducing a liquid thereinto, said pressure responsive valve means comprising a pilot valve housing, fluidtight diaphragm means in said housing, conduit means for applying pipe line pressures to the space within said housing to one side of said diaphragm, spring means braced against the other side of said diaphragm in opposition to said pipe line pressures, first and second valve compartments within said housing, orifice means in communication between said valve compartments, conduit means in communication between said first valve compartment and the first chamber of the main valve, conduit means in communication between the second valve compartment and the downstream portion of the pipe line, and valve means actuated by said diaphragm means for closing the orifice means between said compartments.

NORRIS PLANK.

REFERENCES CITED

The following references are of record in the file of this patent:

UNITED STATES PATENTS

| Number | Name | Date |
| --- | --- | --- |
| 231,214 | Curtis | Aug. 17, 1880 |
| 934,083 | Mills | Sept. 14, 1909 |
| 1,357,837 | Bouvier | Mar. 2, 1920 |
| 1,925,301 | Campbell | Sept. 5, 1933 |
| 2,047,581 | Gissett | July 14, 1936 |
| 2,351,871 | Parker | June 20, 1944 |
| 2,400,048 | Jones | May 7, 1946 |